W. W. DEAN.
GENERATOR.
APPLICATION FILED APR. 25, 1917.

1,298,465.

Patented Mar. 25, 1919.
2 SHEETS—SHEET 1.

Witnesses

Inventor
William Warren Dean
By H. R. Van Deurater
Attorney

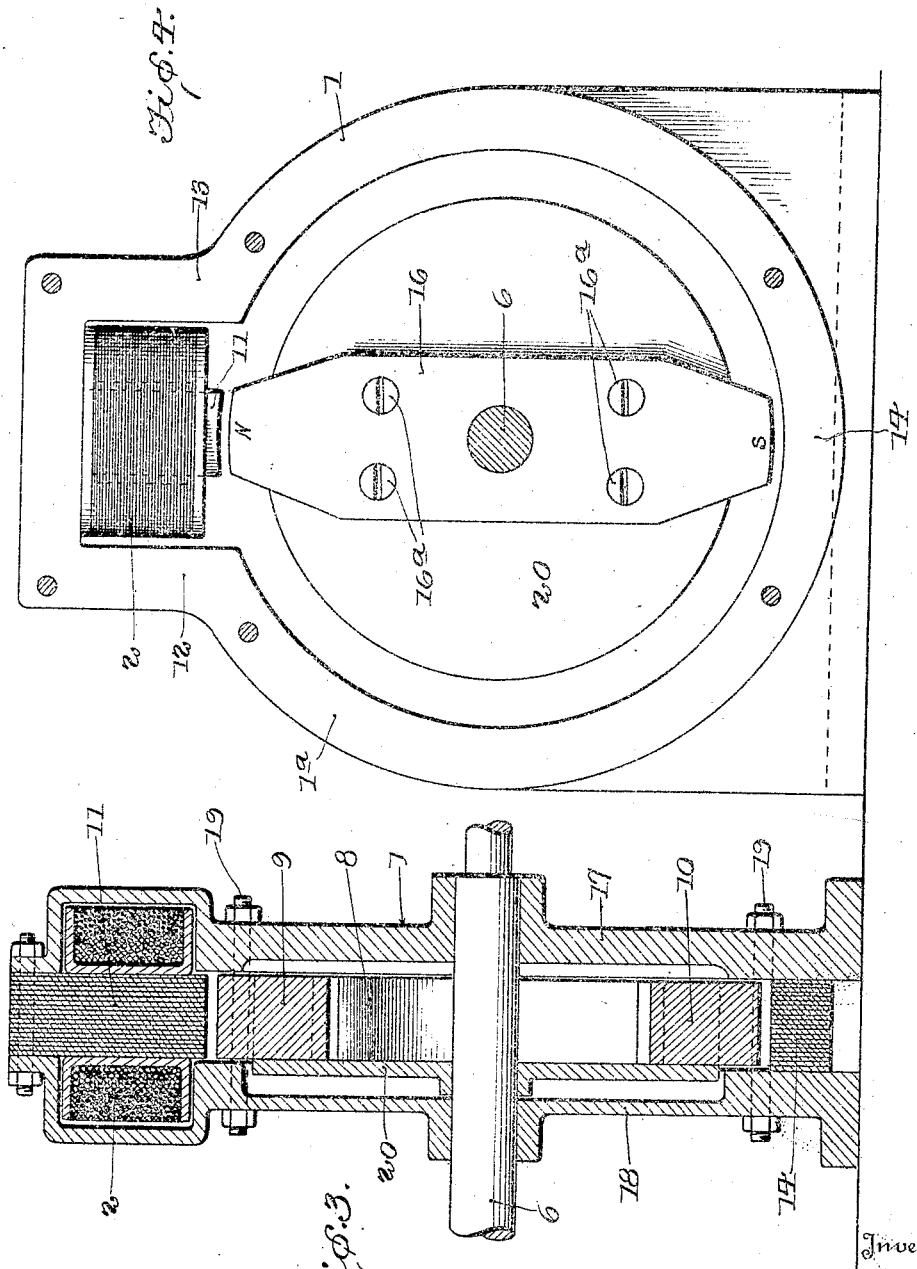

UNITED STATES PATENT OFFICE.

WILLIAM WARREN DEAN, OF STAMFORD, CONNECTICUT, ASSIGNOR TO SPLITDORF ELECTRICAL COMPANY, OF NEWARK, NEW JERSEY, A CORPORATION OF NEW JERSEY.

GENERATOR.

1,298,465.   Specification of Letters Patent.   Patented Mar. 25, 1919.

Application filed April 25, 1917. Serial No. 164,443.

*To all whom it may concern:*

Be it known that I, WILLIAM WARREN DEAN, a citizen of the United States, residing at Stamford, in the county of Fairfield and State of Connecticut, have invented certain new and useful Improvements in Generators, of which the following is a specification, reference being had to the accompanying drawing.

The invention relates to new and useful improvements in generators and more particularly to a generator adapted to produce ignition current.

An object of the invention is to provide a generator of tripolar core structure type having a flux generating element constructed and arranged so as to produce flux reversals and therefore maximum current generation at equal intervals.

A further object of the invention is to provide a generator of the above character having a three legged core structure and a rotating permanent magnet coöperating therewith with a soft iron connection between the outer legs of the core, which soft iron connection is arranged so as to form a flux path between the poles of the magnet.

A still further object of the invention is to provide a generator of the above character wherein the soft iron member forming the flux path also serves as a means for short circuiting the poles of the magnet when the same are in ineffective position to furnish flux to the generating coil.

A still further object of the invention is to provide a generator of the above character wherein said soft iron flux receiving member serves as a part of the housing for the rotating magnet.

In the drawings, which show, by way of illustration the invention:

Fig. 3 is a sectional view on the line 3—3 of Fig. 1.

Fig. 4 is a view similar to Fig. 1 but showing a slightly modified form of generator.

The generator consists broadly in a core structure which is preferably of the tripolar type. On the center leg is placed the generating windings and coöperating with the core structure is a rotating magnet having its poles spaced at equal intervals so that one pole after another is presented to the center leg carrying the generating coil. Connected with the outer legs of the core structure and forming a part thereof is a soft iron member which serves as a flux path for the flux flowing from one pole of the magnet to another. This soft iron flux receiving member also serves as a means for short circuiting the poles of the magnet when they are ineffective to furnish flux to the generating coil. By this arrangement, first one pole and then another is presented to the center leg carrying the generating coil so that the flux reversals through the coil are spaced at equal time intervals.

Figure 1:
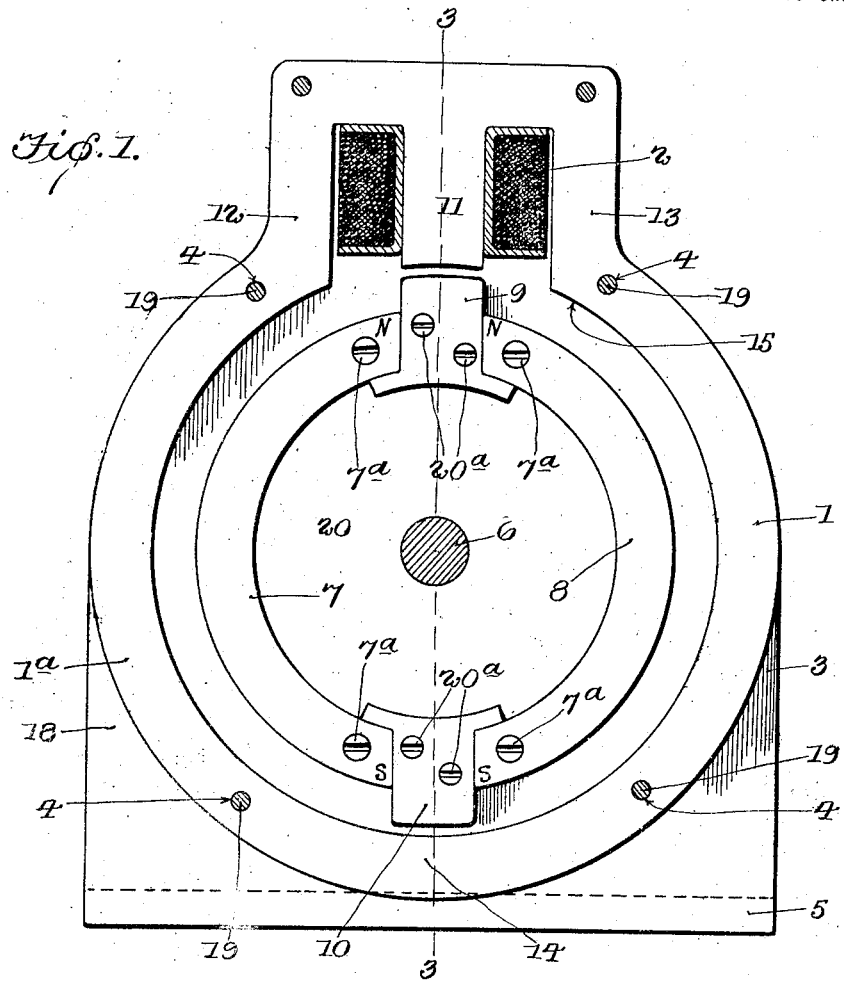
Figure 1 is a view in longitudinal section through a generator having my improvements applied thereto.
Figure 2:
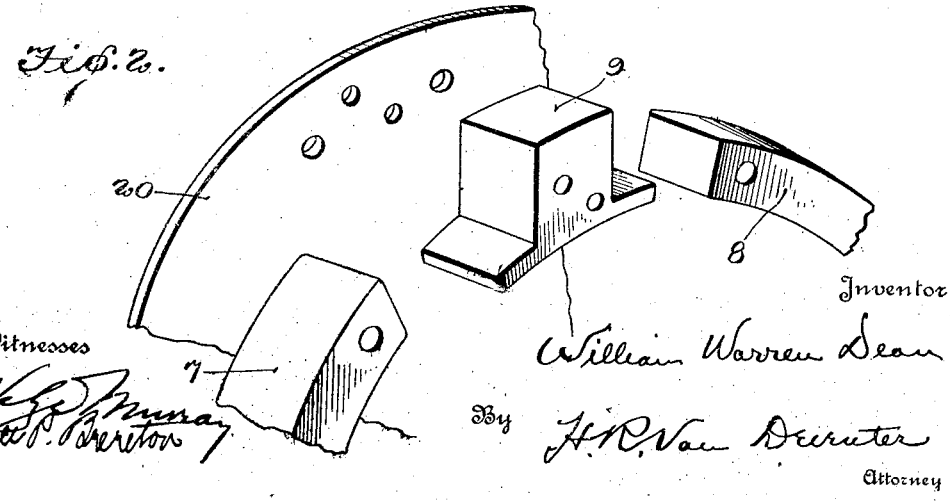
Fig. 2 is a perspective view showing the ends of the two magnets, a pole piece between the same, and a portion of the non-magnetic plate for joining and supporting the magnet sections and pole pieces, these parts being detached and separated.

Referring more in detail to the drawings my improved generator consists of a core structure which is shown in Fig. 1 and is preferably laminated throughout and is indicated by the numeral 1. This core structure is of the tripolar type, that is, it is formed with three legs indicated at 11, 12 and 13 in the drawings. The generating coil indicated at 2 on the drawings is mounted on the center leg and preferably consists of a primary and secondary winding, as the generator is specially adapted for ignition purposes. The primary winding will be provided with the usual interrupter timed so as to break the circuit at the point of maximum current generation therein. The outer legs 12 and 13 are connected by the soft iron member 1ª which is a part of the core structure. This connecting member 1ª is in the form of a ring. Secured to the core structure are side plates 17 and 18. These side plates are bolted to the core structure by suitable bolts 19 which pass through openings 4 in the core structure. Mounted in suitable bearings in the end plates 17 and 18 is a shaft 6. Secured to this shaft and rotating therewith is a nonmagnetic plate 20. Attached to the non-magnetic plate 20 are two magnets 7 and 8 which are in the form of segments of a circle and these magnets are arranged so that like poles are adjacent to each other. The poles are spaced, and between the adjacent poles are arranged the pole pieces 9 and 10. These pole pieces may be readily shaped to fit and fill the space between the ends of the magnet and are secured to the magnetic plate 20 by suitable screws 20ª. The magnet sections are secured to this non-magnetic plate 20 by suitable screws 7ª. From the above it will be noted that the pole 9 is a north pole, while the pole 10 is a south pole, and these poles are equally spaced, that is, the centers of the poles are disposed one hundred and eighty degrees apart. As the magnets rotate through the turning of the shaft 6, first the north pole will be brought into registry with the center leg 11 and then the south pole. When the parts are positioned as in Fig. 1, the flux flow is from the north pole through the leg 11 to the outer legs 12 and 13, thence through the soft iron member 1ª to the south pole 10. When the south pole is opposite the leg 11 there is a reversal of the flux flow. When the pole piece 9 reaches the point indicated at 15 in the drawings, then the poles 9 and 10 will be short circuited by the soft iron flux receiving member 1ª. It will, therefore, be seen that the poles of the magnets are short circuited substantially throughout the entire time when said magnets are ineffective to furnish the generating coil with flux, and when the magnet poles are positioned relative to the generating coil so as to furnish flux to the generating coil the flow of flux from one pole to the other is through this soft iron flux receiving member which has previously operated to short circuit the poles of the magnets.

From the above description it will be apparent that the flux reversals will occur at equal intervals and therefore the maximum current generation will occur at equal intervals.

While I have described the core structure as laminated, it will be understood that the center leg 11 only may consist of laminations, or the legs 11, 12 and 13 may consist of laminations, while the member connecting the legs 12 and 13 may be of cast iron.

In Fig. 4 of the drawings I have shown a slightly modified form of the invention wherein the magnet indicated at 16 is in the form of a bar magnet extending diametrically across the housing of the generator. This magnet 16 is mounted on the shaft 6 and is secured to the non-magnetic disk 20 by suitable screws 16ª. The operation of this magnet is precisely the same as that described above.

While I have shown the magnet as rotating within the core structure, it is understood that the arrangement of parts may be varied, the essential feature consisting in the causing of the poles of the magnet to pass the leg of the core structure at equal intervals of time and the connecting of the outer legs of the core structure in such a way as to provide a flux path for the flow of flux from one pole of the magnet through the generating coil to the other; also in such a way as to short circuit the poles of the magnet when such magnet is ineffective to furnish flux to the generating coil.

Having thus described my invention, what I claim as new and desire to secure by Letters Patent is:

1. A generator including, in combination, a three-legged core structure, a generating coil carried by the center leg, a rotatable magnet having its poles spaced so as to pass said center leg carrying the generating coils at equal time intervals, and a flux receiving member connected with the outer legs of the core disposed so as to provide a flux path between the poles of the magnet when said magnet is furnishing flux to the generating coil.

2. A generator including, in combination, a three-legged core structure, a generating coil carried by the center leg, a rotatable magnet having its poles spaced so as to pass said center leg carrying the generating coils at equal time intervals, and a flux receiving member connected with the outer legs of the core disposed so as to provide a flux path between the poles of the magnet when said magnet is furnishing flux to the generating coil, said flux receiving member also being disposed so as to short circuit the poles of the magnet when they are ineffective to furnish flux to the generating coil.

3. A generator including, in combination, a three-legged core structure, a generating winding on the center leg of the core, a rotatable magnet disposed so as to present its poles one after the other to said center leg for furnishing flux to the generating coil, a circular soft iron member connecting the outer legs of the core and forming in part a housing for the rotating magnet.

4. A generator including, in combination, a three-legged core, a generating coil on the center leg of said core, a shaft, a non-magnetic disk carried by said shaft, a permanent magnet mounted on said disk with its poles diametrically disposed, side plates having bearings for said shaft, a circular soft iron member connecting the outer legs of said core and serving as a housing for said magnet, said side plates being secured to said soft iron member.

5. A generator including, in combination, a three-legged core, a generating coil on the center leg of said core, a circular soft iron member connecting the outer legs of the core, side plates secured to said circular member, a shaft journaled in the side plates, a non-magnetic disk mounted on said shaft, a permanent magnet carried by said non-magnetic disk and including magnet sections having like poles arranged adjacent to each other and spaced, a pole piece secured to the non-magnetic disk and extending between and filling the space between the ends of the magnet sections, said pole pieces being extended beyond the magnet sections and moving in a path close to the end of the center leg of the core and close to the inner face of the circular soft iron member, whereby said soft iron member serves as a flux path for the flux through the generating coil from one pole of the magnet to the other, and also as a flux path for short circuiting the poles of the magnet when the pole pieces are moved away from the center leg of the core.

In testimony whereof I hereunto affix my signature.

WILLIAM WARREN DEAN.